G. L. TANZER.
FURNACE FOR TREATING ORES.
APPLICATION FILED JULY 24, 1917.

1,249,854.

Patented Dec. 11, 1917.

Inventor
Gottwerth L. Tanzer

By C. D. Haskins
Attorney

G. L. TANZER.
FURNACE FOR TREATING ORES.
APPLICATION FILED JULY 24, 1917.

1,249,854.

Patented Dec. 11, 1917.
4 SHEETS—SHEET 2.

Inventor
Gottwerth L. Tanzer
By C. D. Haskins
Attorney

G. L. TANZER.
FURNACE FOR TREATING ORES.
APPLICATION FILED JULY 24, 1917.

1,249,854.

Patented Dec. 11, 1917.
4 SHEETS—SHEET 3.

Inventor
Gottwerth L. Tanzer
By C. D. Hackins
Attorney

G. L. TANZER.
FURNACE FOR TREATING ORES.
APPLICATION FILED JULY 24, 1917.

1,249,854.

Patented Dec. 11, 1917.
4 SHEETS—SHEET 4.

Inventor
Gottwerth L. Tanzer

By C. D. Haskins
Attorney

UNITED STATES PATENT OFFICE.

GOTTWERTH L. TANZER, OF SEATTLE, WASHINGTON.

FURNACE FOR TREATING ORES.

1,249,854.  Specification of Letters Patent.  Patented Dec. 11, 1917.

Application filed July 24, 1917. Serial No. 182,548.

*To all whom it may concern:*

Be it known that I, GOTTWERTH L. TANZER, citizen of the United States, residing at Seattle, in the county of King and State of Washington, have invented a certain new and useful Improvement in Furnaces for Treating Ores, of which the following is a specification.

My invention relates to improvements in furnaces which are adapted for use in roasting ores preparatory to further treating such ores in the operation of extracting the metal therein contained; and the object of my invention is to provide an electric furnace within which may be disposed ore to be treated, together with a separate quantity of charcoal, and which furnace, with said ore and charcoal contained therein, may be closed to be airtight and thereupon be operated to heat said ore and charcoal and to cause resultant heated gases continuously to circulate through said ore and said charcoal during a length of time sufficient to roast, or to reduce to a metallic state, metal contained in said ore.

I attain this object by devices illustrated in the accompanying drawings, wherein—

Figure 1:
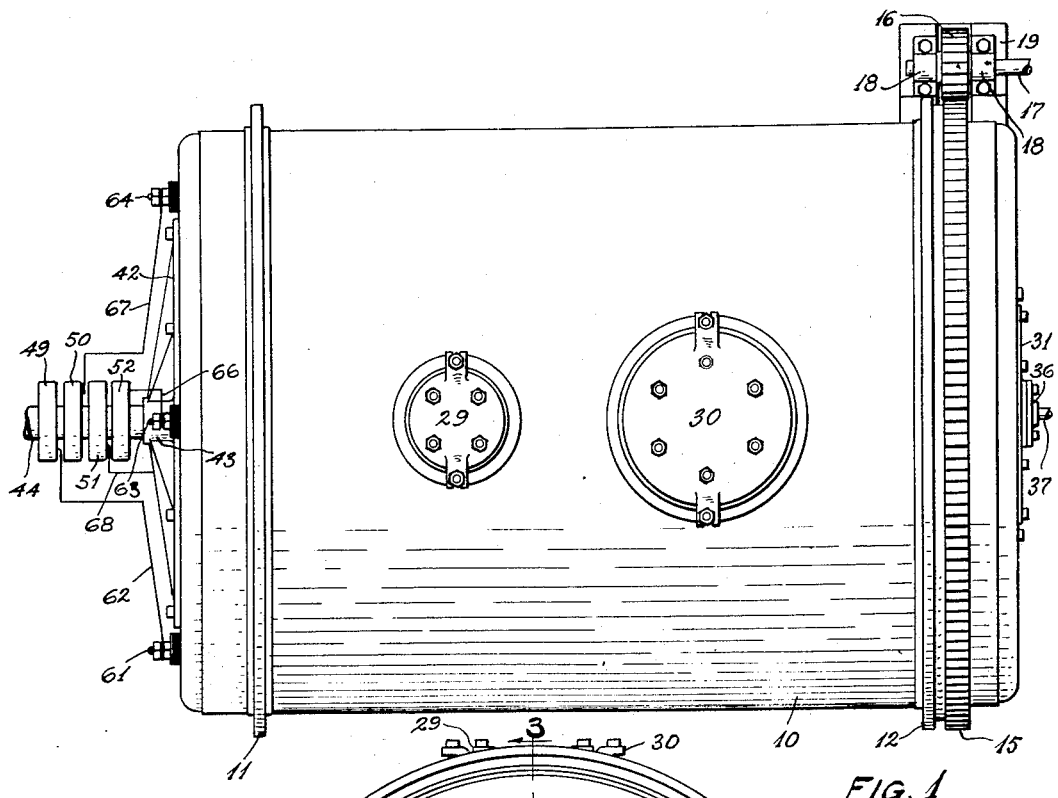
Figure 1 is a plan view of one form of apparatus embodying my invention.
Figure 2:
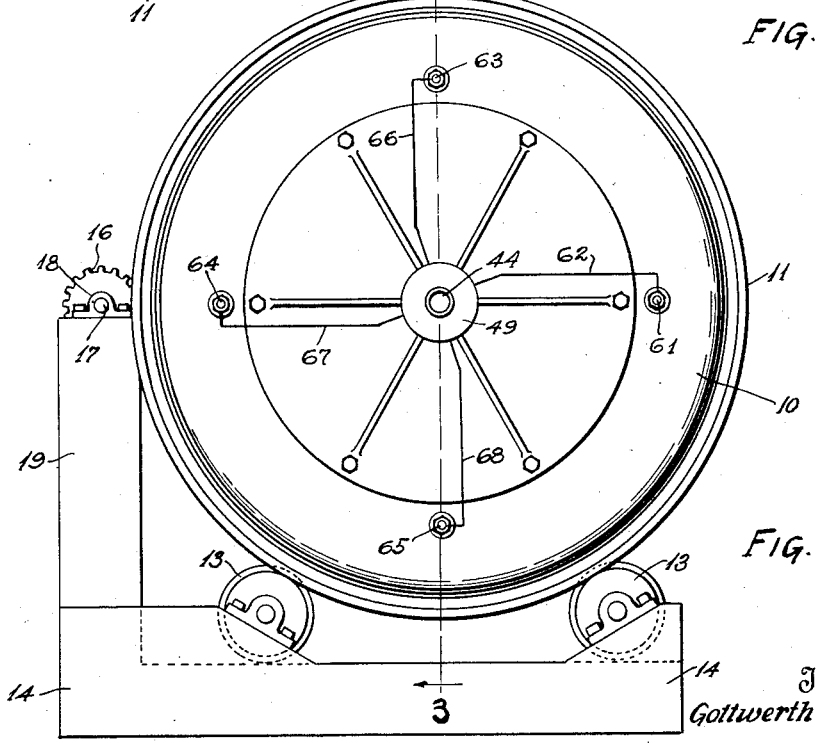
Fig. 2 is a view of the same, in elevation of that end of it, whereon are disposed its electric terminals.
Figure 3:
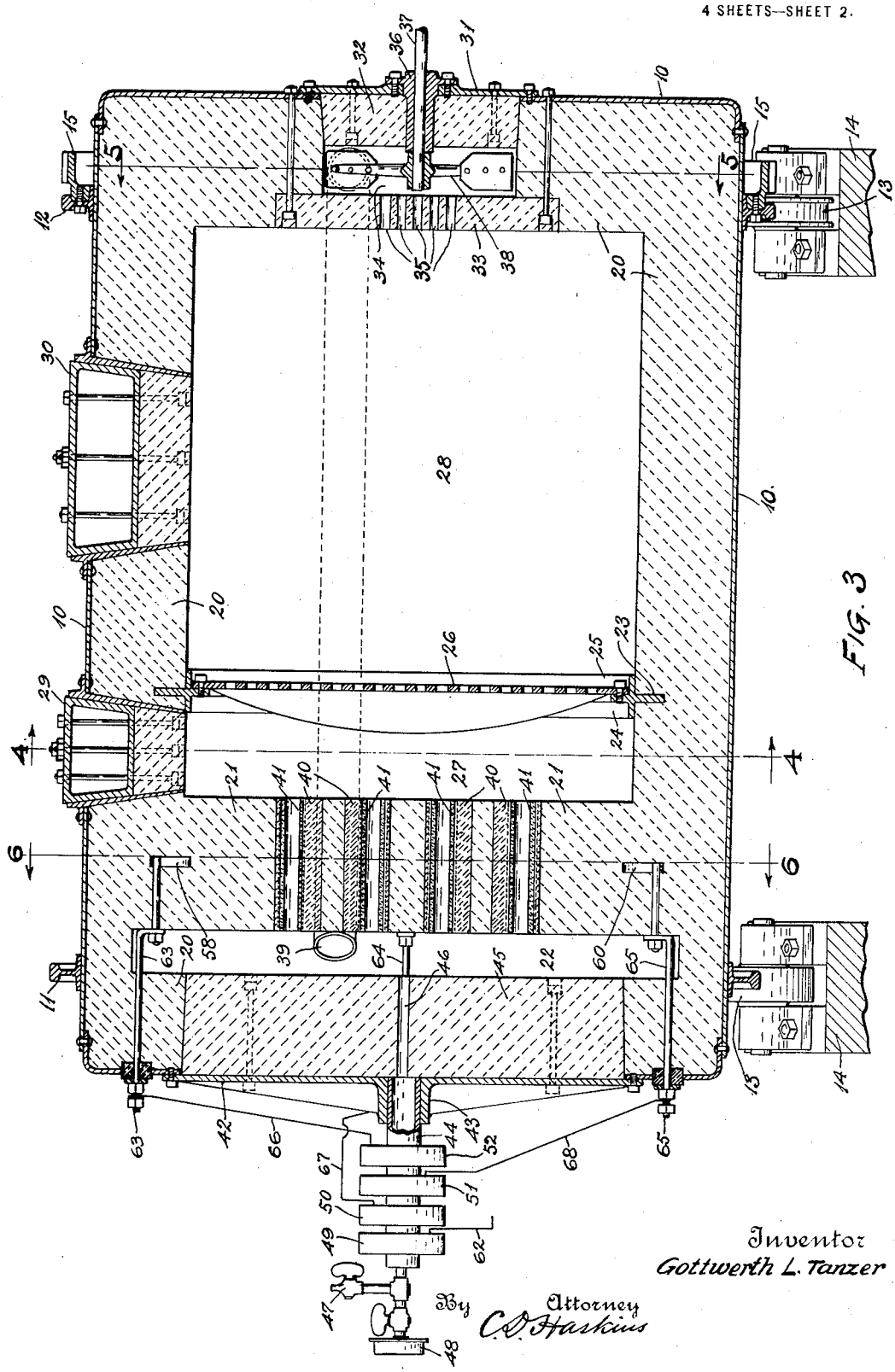
Fig. 3 is an enlarged view of the same in vertical longitudinal mid-section, on broken line 3, 3 of Fig. 2.
Figure 4:
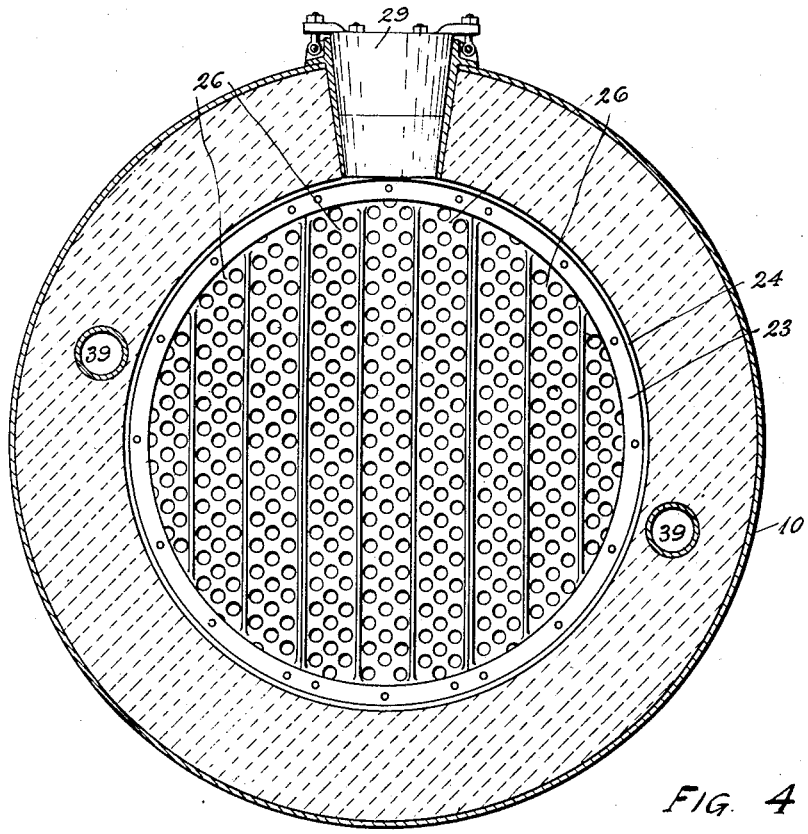
Fig. 4 is an enlarged view of the same in vertical cross-section on broken line 4, 4 of Fig. 3.
Figure 5:
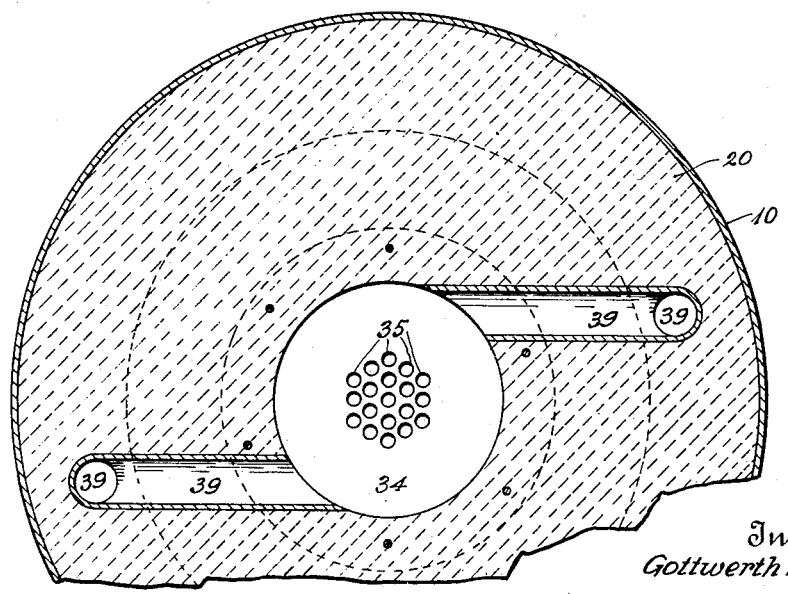
Fig. 5 is an enlarged fragmentary view of the same in vertical cross-section on broken line 5, 5 of Fig. 3.

Referring to the drawings, throughout which like reference numerals indicate like parts, 10 designates a receptacle of the form of a hollow cylinder formed of heavy sheet metal whose end portions are each surrounded by a hoop of metal, as hoops 11 and 12, securely fastened thereon, which hoops 11 and 12 in radial section are of the form of a railroad rail whereby they are adapted to engage with and rest upon rollers 13 which are rotatably mounted on supports 14 in the manner more clearly shown in Figs. 2 and 3, thereby to adapt said receptacle 10 to be rotatably movable.

Fastened to the side of the hoop 12 is an annular toothed gear wheel 15 whose teeth operatively engage with a pinion 16 which is fastened on a shaft 17 one of whose end portions is journaled in bearings 18 that are mounted on a support 19, which shaft 17 may be connected with a source of rotary motion not shown whereby at times desired rotary motion may be communicated to said receptacle 10.

The inner sides of the circular wall and end walls of the receptacle 10 are provided with a lining 20 of refractory earthy material, preferably fire brick, and spaced from the inner side of one end wall of the receptacle 10 is disposed a partition 21 of like refractory earthy material which is integral with the lining 20, whereby is formed a chamber 22 between one side of said partition 21 and said one end wall.

On the other side of said partition 21 in a position spaced therefrom is an annular plate 23 which is provided with integral annular flanges 24 and 25 which project from opposite sides thereof to engage with the inner circular surface of the lining 20, the peripheral portion of said annular plate 23 being embedded in said lining 20 and its annular portion projecting inwardly from the flanges 24 and 25 as shown in Fig. 3.

To one side of the inner portion of the annular plate 23 are fastened a plurality of perforated grate bars 26 which form a grating that serves as a perforated partition thereby to provide a separate compartment 27 that extends between the partition 21 and said grating, and a larger compartment 28 that extends from said grating to the lining 20 of the distant end wall of the receptacle 10, as shown in Fig. 3.

Extending through the circular wall of the receptacle 10 and its lining 20 into both of the compartments 27 and 28 are openings which are respectively closed to be airtight by removable hollow plugs 29 and 30 whose inner end surfaces are also lined with refractory earthy material like the lining 20; which plugs 29 and 30 may be removed during the operation of filling the compartment 27 with charcoal, and charging the compartment 28 with ore to be treated.

As indicated in Fig. 3 the right hand end wall of the receptacle 10 and its lining 20 is provided with a large circular opening which is closed to be airtight by a concentrically disposed removable circular plate 31 whose inner side is provided with a refractory lining 32 which extends only a part of the way through the lining 20, the inner end portion of said large circular opening being closed by a disk 33 of refractory material whereby is formed a chamber 34.

The disk 33 is provided with a plurality of holes 35 which form passageways for gases between the compartment 28 and chamber 34.

The circular plate 31 is provided with a concentrically disposed shaft bearing 36 extending through it, and within said shaft bearing 36 is rotatably disposed a shaft 37 one end portion of which projects into the chamber 34 and the other end portion of which may be extended to connect with a source of rotary motion, as to an electric motor, not shown.

Mounted on the end portion of the shaft 37 within the chamber 34 is a rotary fan 38 whose rotation in a proper direction will tend to draw gases from the compartment 28 into the chamber 34.

Formed in the lining 20 to extend from the chamber 34 into the chamber 22 are two flues 39 through which gases, which are drawn into the chamber 34 by the operation of the fan 38, may be caused to flow from said chamber 34 into said chamber 22.

Embedded in the partition 21 to extend between the chamber 22 and the compartment 27 are a plurality of conduits 40, of molded refractory earthy material, through each of which conduits 40 extend holes within each of which holes is disposed an electrical heating element (as heating elements 41) which comprises a tube of refractory material that is a non-conductor of electricity surrounded with a helix of suitable wire that can be efficiently heated by an electrical current in a well known manner.

All of the holes through the tubes of all of the heating elements 41 serve as passageways through which gases may flow from the chamber 22 into the compartment 27 there to percolate through the charcoal that may be contained therein and flow thence through the grate bars 26 into the compartment 28 where said gases may percolate through ore that may be contained therein and thence flow through the passageways 35 into the chamber 34 thence through the flues 39 back to the chamber 22, thus to maintain a constant circulation of said gases in response to the operation of the fan 38.

The end wall of the receptacle 10 adjacent to the chamber 22 is provided with a concentrically disposed large opening which is closed to be airtight by a circular plate 42 which is provided with a concentrically disposed integral hub 43 which extends for a short distance outwardly from the outer side thereof, and within which hub 43 is fixed a hollow shaft 44 that extends therethrough and projects outwardly therefrom as shown in Fig. 3.

The inner side of the plate 42 is provided with a lining 45 made of refractory earthy material like that of the lining 20, and extending through said lining 45 is a passageway 46 through which gases may flow from the chamber 22 into the hollow shaft 44 to the outer end of which is attached a petcock 47 and a pressure gage 48, which petcock 47 may be operated to permit the escape of gases from the hollow shaft 44 thus to relieve the pressure of gases within the receptacle 10, said pressure gage 48 serving to indicate such pressure.

Mounted on the shaft 44 and electrically insulated therefrom are four contact rings 49, 50, 51 and 52 of metal which may make slipping contacts with metal contact brushes, not shown, which brushes may be connected with a source of electricity not shown.

Figure 6:
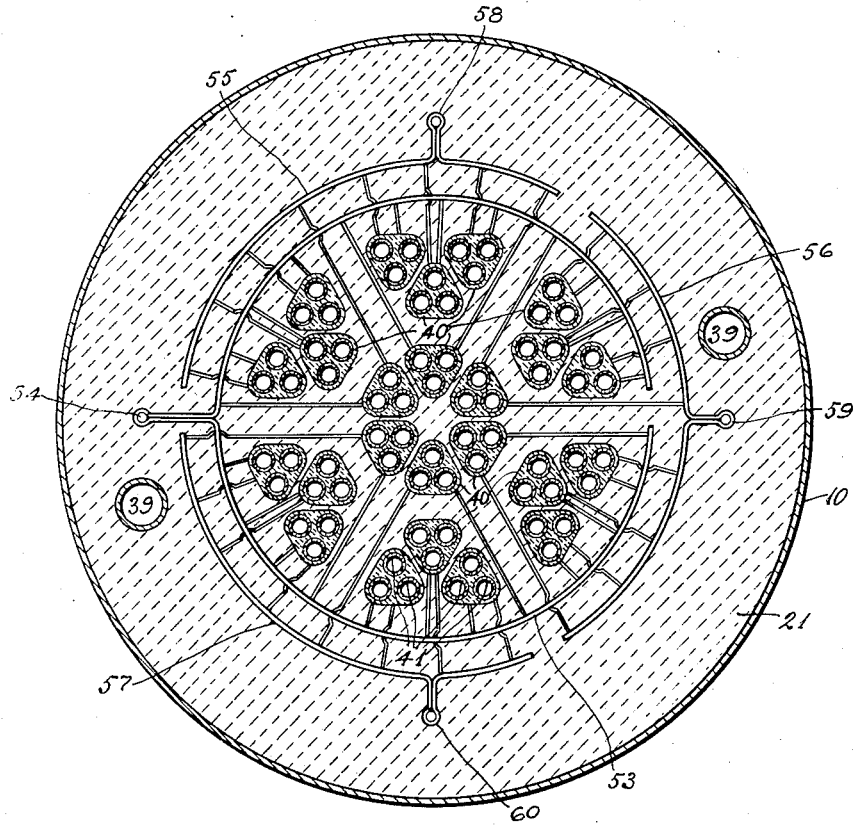
Fig. 6 is an enlarged view of the same in vertical cross-section on broken line 6, 6 of Fig. 3.
Figures 7, 8:
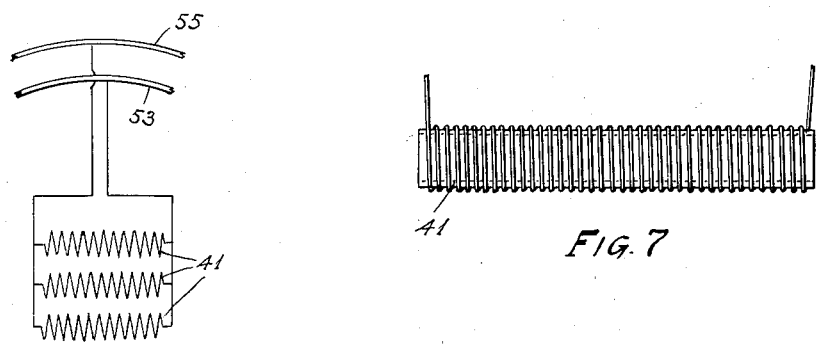
Fig. 7 is an enlarged view in side elevation of a detail of the same.
Fig. 8 is a diagram illustrating the electrical connections between some of its parts.

As shown in Fig. 6, embedded in the partition 21 is a circular bus-conductor 53 which extends around and is spaced from all of the conduits 41, which bus-conductor 53 is provided with a connector terminal 54, and one terminal of all of the heating elements 41 is electrically connected with said bus-conductor 53.

Concentrically disposed in a circle spaced from the outer side of the bus-conductor 53 are three bus-conductors 55, 56 and 57, of the form of a segment of a circle, each of which is provided with a connector terminal, as terminals 58, 59 and 60, to each of which are electrically connected the other terminals of the adjacent twenty four of the seventy two heating elements 41 as shown in Fig. 6.

The terminal 54 of the bus-conductor 53 is electrically connected with the contact ring 49 by means of a conducting rod 61 and a conducting wire 62, which conducting rod 61 extends through and is insulated from the end wall of the receptacle 10, while the terminals 58, 59 and 60 are connected respectively with contact rings 52, 50, and 51 by conducting rods 63, 64 and 65 and conducting wires 66, 67 and 68 respectively, said conducting rods 63, 64 and 65, like the conducting rod 61, being extended through, and insulated from, the end wall of the receptacle 10 as indicated in the drawings.

Thus, the contact ring 49 serves as a common terminal to which one end of each of all the conductors of the heating elements 41 is connected while the contact rings 50, 51 and 52 serve each as a common terminal for the other ends of the conductors of the heating elements 41 of a different one of the three separate groups of said heating elements 41, whereby all of said heating elements may be connected in parallel circuits.

While I have shown only one plan of circuits for conducting electricity to the heating elements 41, it is obvious that any one of many other plans well known to those skilled in the art may be employed.

The operation of my invention, as embodied in the structure illustrated and described, is as follows:

The compartment 27 is filled with charcoal and the compartment 28 is charged with ore to be treated and thereupon the plugs 29 and 30 are disposed to make the receptacle airtight, the pet-cock 47 being closed. Then the contact ring 49 is connected with one terminal of a source of electricity and the contact rings 50, 51 and 52 are each connected to the other terminal of a source of electricity whereby the heating elements 41 are connected to said source of electricity in parallel circuits with the result that said heating elements 41 will generate heat to heat to a high temperature the gases that flow through the passageways that extend through said elements 41, which gases are caused to flow therethrough by the operation of the fan 38 to which rotary motion is communicated by the shaft 37, since said fan 38 will draw said gases from the compartment 28 and force them to flow through the flues 39 into the chamber 22, thence through the passageways extending through the heating elements 41 (where said gases will be highly heated) thence such highly heated gases will percolate through the charcoal in the compartment 27 and through the perforated grate bars 26 again into the compartment 28 where they will percolate through the ore therein and from which they again flow through the passageway 35 into the chamber 34 thus continuously to circulate in an obvious manner during the rotation of the fan 38.

It is important that the fan 38 shall always be in operation whenever current is flowing through the heating elements 41, and if for any reason the operation of said fan 38 is interrupted the source of electricity must be immediately disconnected from said heating elements 41.

In accordance with well known chemical laws the gases at a high temperature which are caused to percolate through the charcoal in the compartment 27 will thereupon become a reducing agent that will continuously act upon the ore within the compartment 28, as it percolates therethrough, to extract the oxygen combined with the metal thereof thus to bring the metal contained in said ore to a pure metallic state, without fusing the ore.

While I have shown only electrical means for heating to an effectively high temperature the gases as they flow from the chamber 22 into the compartment 27 other means may be substituted therefor, as for instance, the walls of such passageways might be so exposed by removing portions of the refractory earthy material of the partition 21 as to adapt them to be subjected to the heat of a flame and products of combustion of any suitable fuel, as of mineral oil, natural gas and solid fuels in a manner that would be obvious to those skilled in the art.

The important object of my invention is to provide means for causing a reducing agent comprising gases at a high temperature constantly to circulate and percolate through a body of charcoal and a body of ore contained in an airtight receptacle, the temperature of such gases not being sufficiently high to fuse such ore, but being high enough to reduce the metal contained in such ore to a metallic state.

During the operation of treating ore, such operation may be expedited by causing the receptacle 10 to be rotated thereby to agitate the ore contained therein thus more evenly to subject it to contact with the gases percolating therethrough, but such rotation is not absolutely necessary for effective treatment of said ore.

Manifestly, changes may be made in the forms, dimensions and arrangement of parts of my invention without departing from the spirit thereof.

What I claim is:

1. A furnace of the class described, which embodies a rotatable airtight receptacle made of sheet metal and lined with refractory earthy material; a partition made of refractory earthy material disposed in a position adjacent to and spaced from the inner side of one end of said receptacle to form a separate gas chamber; a grating disposed adjacent to and spaced from said partition thereby to provide a compartment for charcoal between said partition and said grating and further to provide a larger compartment for ore between said grating and the lining at the distant other end of said receptacle; a fan chamber formed in the lining of said distant end of said receptacle; passageways for gases disposed to extend from said larger compartment into said fan chamber; a flue for gases formed in said lining and disposed to extend from said fan chamber into said gas chamber; a plurality of electric heating elements each provided with a passageway therethrough and all embedded in said partition to extend therethrough to permit gases to flow from said gas chamber into said compartment for charcoal; means for conducting electricity to said heating elements; and a rotary fan disposed in said fan chamber and operatively adapted to cause gases to circulate in a course through said fan chamber thence through said flue, thence through said gas chamber, thence through said heating elements, thence through said compartment for charcoal, thence through said grating, thence through said larger compartment and through the passageways again into said fan chamber.

2. A furnace of the class described, which embodies an airtight receptacle lined with refractory earthy material and having a partition of like material disposed adjacent to and spaced from the inner side of one end wall of said receptacle to form a separate gas chamber; a grating disposed adjacent to and spaced from said partition thereby to provide a compartment for charcoal between said partition and said grating and further to provide a larger compartment for ore between said grating and the lining at the other end of said receptacle; a fan chamber formed in the lining at said other end of said receptacle; passageways for gases disposed to extend from said larger compartment into said fan chamber; a flue for gases formed in said lining and disposed to extend from said fan chamber into said gas chamber; a plurality of conduits for gases disposed to extend from said gas chamber into said compartment for charcoal; means for heating the walls of said conduits thereby to heat the gases flowing thereto; and a rotary fan disposed in said fan chamber and operatively adapted to cause gases contained in said receptacle to circulate continuously in a course through said fan chamber, thence through said flue, thence through said gas chamber, thence through said conduits, thence through said compartment for charcoal, thence through said grating, thence through said larger compartment and the passageway extending into said fan chamber.

3. A furnace of the class described, which embodies an airtight receptacle lined with refractory earthy material and provided with partitions dividing its interior into a series of four contiguous compartments; a flue for gases extending between the compartment at one end and the compartment at the other end of said receptacle; a series of conduits for gases extending between the compartment at one end of said receptacle and the adjacent compartment; means for heating the walls of said conduit thereby to heat gases flowing therethrough; passageways for gases extending between the intermediate compartments and the compartment at the other end of said receptacle; and a rotary fan operatively disposed in a compartment in one of the ends of said receptacle and adapted to be actuated to cause all gases contained in said receptacle continuously to circulate through all of said compartments.

4. A furnace of the class described, which embodies an airtight receptacle lined with refractory earthy material and having a partition of like material disposed adjacent to and spaced from the inner side of one end wall of said receptacle to form a separate gas chamber; a grating disposed adjacent to and spaced from said partition thereby to provide a compartment for charcoal between said partition and said grating and further to provide a larger compartment for ore between said grating and the lining at the other end of said receptacle; a fan chamber formed in the lining at said other end of said receptacle; passageways for gases disposed to extend from said larger compartment into said fan chamber; a flue for gases formed in said lining and disposed to extend from said fan chamber into said gas chamber; a plurality of conduits for gases disposed to extend from said gas chamber into said compartment for charcoal; and a rotary fan disposed in said fan chamber and operatively adapted to cause gases contained in said receptacle to circulate continuously in a course through said fan chamber, thence through said flue, thence through said gas chamber, thence through said conduits, thence through said compartment for charcoal, thence through said grating, thence through said larger compartment and the passageway extending into said fan chamber.

In witness whereof, I hereunto subscribe my name this 16th day of July A. D., 1917.

GOTTWERTH L. TANZER.